United States Patent
Matsuura et al.

(10) Patent No.: US 6,188,425 B1
(45) Date of Patent: *Feb. 13, 2001

(54) EXPOSURE DEVICE CAPABLE OF REDUCING UNEVENNESS IN QUANTITY OF LIGHT

(75) Inventors: Kuniya Matsuura, Toyohashi; Kazuhiro Sakamoto, Toyokawa, both of (JP)

(73) Assignee: Minolta Co., Ltd, Osaka (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/833,764

(22) Filed: Apr. 9, 1997

(30) Foreign Application Priority Data

Apr. 12, 1996 (JP) ......................................... 8-091175
Apr. 12, 1996 (JP) ......................................... 8-091176

(51) Int. Cl.[7] .................................................. B41J 2/47
(52) U.S. Cl. .......................... 347/239; 347/237; 347/136
(58) Field of Search ..................... 347/237, 238, 347/239, 240, 241, 136; 250/205; 349/2, 3

(56) References Cited

U.S. PATENT DOCUMENTS

| | | | |
|---|---|---|---|
| 4,596,995 | | 6/1986 | Yamakawa et al. .................. 347/237 |
| 4,679,057 | * | 7/1987 | Hamada ............................... 347/252 |
| 4,839,672 | * | 6/1989 | Reinten ................................ 347/238 |
| 4,897,672 | * | 1/1990 | Horiuchi et al. ..................... 347/241 |
| 4,975,729 | * | 12/1990 | Gordon ................................. 347/136 |
| 5,166,510 | * | 11/1992 | Matsubara et al. .................. 250/205 |
| 5,260,718 | * | 11/1993 | Rommelmann et al. ............ 347/136 |
| 5,485,191 | * | 1/1996 | Gu ....................................... 347/240 |

FOREIGN PATENT DOCUMENTS 61-051362  3/1986 (JP) .

* cited by examiner

Primary Examiner—N. Le
Assistant Examiner—Lamson D. Nguyen
(74) Attorney, Agent, or Firm—Sidley & Austin

(57) ABSTRACT

An optical shutter drive period detector detects a drive period of each optical shutter element. Based on the detected drive period, an optical shutter drive voltage control device sets an optical shutter driving voltage which is applied to an optical shutter driver. Furthermore, an optical shutter open period controller sets an optical shutter open period corresponding to the set optical shutter driving voltage and to a tone level of a pixel to be exposed and the optical shutter open period is input to the optical shutter driver as data for changing an optical shutter open period. Based on the optical shutter driving voltage and the optical shutter open period changing data, the optical shutter driver drives each optical shutter element of an optical shutter array, an electrostatic latent image is formed on a surface of a photosensitive drum, and the electrostatic latent image is developed by a developer, transferred by a transfer/separation charger onto a recording sheet and discharged. Thus, an image consisting of pixels of a multivalue tone level can be formed by exposure in an constantly appropriate state.

26 Claims, 11 Drawing Sheets

| PIXEL NO. | IMAGE-PORTION DRIVE PERIOD | INTERIMAGE-PORTION DRIVE PERIOD |
|---|---|---|
| 1 | $T_1$ | $A-T_1$ |
| 2 | $T_2$ | $A-T_2$ |
| 3 | $T_3$ | $A-T_3$ |
| . | . | . |
| m | $T_m$ (=A) | 0 |
| . | . | . |
| x | $T_x$ | $A-T_x$ |
| . | . | . |
| n-1 | $T_{n-1}$ | $A-T_{n-1}$ |
| n | $T_n$ | $A-T_n$ |

($T_m$=) A: LARGEST VALUE OF $T_1$-$T_n$

OPTICAL SHUTTER OPEN PERIOD Toc [msec]

| DRIVING VOLTAGE VD [V] | TONE (o~n) | | | | |
|---|---|---|---|---|---|
| | n | n-1 | ··· | 1 | 0 |
| V0 | T0,n | T0,n-1 | ··· | T0,1 | T0,0 |
| V1 | T1,n | T1,n-1 | ··· | T1,1 | T1,0 |
| V2 | T2,n | T2,n-1 | ··· | T2,1 | T2,0 |
| · | · | · | ··· | · | · |
| · | · | · | ··· | · | · |
| · | · | · | ··· | · | · |
| Vn | Tn,n | Tn,n-1 | ··· | Tn,1 | Tn,0 |

DIRECTION OF ARRANGEMENT

DIRECTION OF ARRANGEMENT

EXPOSURE DEVICE CAPABLE OF REDUCING UNEVENNESS IN QUANTITY OF LIGHT

FIELD OF THE INVENTION

The present invention relates to an exposure device and, in particular, to an exposure device using an optical shutter.

BACKGROUND OF THE INVENTION

FIG. 12 shows a configuration of an image forming device 700 with a conventional image exposure device.

Referring to FIG. 12, arranged in image forming device 700 are a photosensitive drum 701, as an electrostatic latent image holder; a corona charger 702, which charges a surface of photosensitive drum 701 around drum 701 in the direction in which drum 701 rotates; an exposure device 700 having an optical shutter array (also referred to as an optical shutter head) 703 which exposes an image by one line on the charged surface of photosensitive drum 701 and an optical shutter driver 704 which drives optical shutter array 703, a developer 705 which develops an electrostatic latent image with a toner, a transfer/separation charger 706 which transfers a toner image obtained by the development onto a recording sheet, a cleaner 107 which removes residual toner on the photosensitive drum 701, and a residual charge elimination lamp 108 which illuminates the photosensitive drum 701 and removes residual charge of the photosensitive drum 701. A recording sheet 709 is transported by a transportation roller 710 between photosensitive drum 701 and transfer/separation charger 706.

Optical shutter array 703 is a solid scanner component having a plurality of optical shutter elements arranged in the longitudinal direction along the rotation axis of photosensitive drum 701.

FIGS. 13A and 13B show arrangements of optical shutter elements of optical shutter array 703 shown in FIG. 12.

Referring to FIGS. 13A and 13B, optical shutter elements of optical shutter array 703 are those formed of liquid crystal, PLZT (Pb Lanthanum-added Zirconate Titanate) or the like which are arranged in one line, as shown in FIG. 13A, or staggered in two lines, as shown in FIG. 13B, such that the number thereof corresponds to a width to be recorded on a recording sheet.

FIG. 14 is a cross sectional view of a configuration of a PLZT optical shutter head 900 as an example of optical shutter array 703 shown in FIG. 12.

Referring to FIG. 14, PLZT optical shutter head 900 includes a light emitting portion 30, a rod lens 31 which collects a linear pencil of light from light emitting portion 30, an optical shutter portion 32 which selectively transmits light from rod lens 31, and a rod lens array 33 which converges light transmitted from optical shutter portion 32.

Light emitting portion 30 includes a halogen lamp 34 as a point source of light, and a fiber optic light guide 35 which converts a pencil of light from the point source of light to a linear pencil of light.

Optical shutter portion 32 is constituted by a polarizer 36 which selectively transmits only the light in a certain polarization direction of incident light having a random plane of polarization and an analyzer 38 which transmits only the light in the polarization direction angled by an angle of 90ø relative to the polarization direction of the light transmitted from polarizer 36, with a PLZT optical shutter array 37 having electro-optic effect disposed therebetween, an optical shutter element of PLZT optical shutter array 37 having micropixels.

When a voltage is applied to an optical shutter element having micropixels and forming the PLZT optical shutter array 37 in the optical shutter portion 32, a plane of polarized light, transmitted from polarizer 36, is rotated and then passes through analyzer 38. On the other hand, when a voltage is not applied to an optical shutter element, a plane of polarized light, transmitted from polarizer 36, is unchanged and hence blocked by analyzer 38. Light is selectively transmitted depending on whether or not voltage is applied to each of optical shutter elements forming PLZT optical shutter array 37.

In an image forming device as described above, a driving voltage for an optical shutter element is preset. At the driving voltage, a period during which the optical shutter is opened is predetermined depending on the output pixel tone and thus it is operated.

However, as an accumulated drive period, i.e., an accumulation of periods during which an optical shutter is opened, is increased, durability of the optical shutter element is degraded and the quantity of light tends to be gradually decreased.

FIG. 6 shows how the amount of light emission of an optical shutter element changes relative to an accumulated optical shutter element drive period.

Referring to FIG. 6, in a conventional exposure device in which as the accumulated drive period is increased, the amount of light emission is decreased due to durability degradation of an optical shutter. When a predetermined period elapses, an accumulated drive period of an optical shutter element for a pixel A arranged in the longitudinal direction differs from that of an optical element for a pixel B arranged in the longitudinal direction, for example, depending on the image patterns which have been output and a drive period difference Δt is caused. That is, if there is a drive period difference of Δt between the optical shutter elements corresponding to pixels A and B, as shown in FIG. 6, there also is a difference in the amount of decreased light emission (the amount of degradation) and thus the difference ΔE in the amount of light emission is caused.

Thus, since a plurality of optical shutter elements arranged in the longitudinal direction each have different accumulated drive periods, the reduced amount of light emission is different for each optical shutter element, thus causing unevenness in the quantity of light.

FIG. 15 is a state diagram illustrating a relationship between the period during which an optical shutter is opened (referred to as an optical shutter open period hereinafter) and the quantity of light outputted.

Referring to FIG. 15, in a conventional image forming device, which is assumed to be free from degradation and thus ideal, the optical shutter open period and the quantity of light are assumed to satisfy a linearly proportional relationship designated by the letter a and thus an optical shutter element open period corresponding to a tone is fixed independently of the drive period of each optical shutter element. In practice, however, the quantity of light is decreased due to degradation, as designated by the letter b, and thus it can be difficult to reproduce a pixel in a tone of interest.

If a voltage which drives an optical shutter element (referred to as a driving voltage hereinafter) is increased to compensate for the reduced quantity of light to achieve the state designated by the letter a, then the relation between the optical shutter open period and the quantity of light transmitted from the optical shutter will become nonlinear. If an optical shutter element is extremely degraded, deficiency in the quantity of light can be caused as the optical shutter open period reaches or exceeds $T_1$, as designated by the letter c. If an optical shutter element is not so degraded, increase in the driving voltage can lead to saturation of the quantity of light, as designated by the letter d.

Thus, increasing the driving voltage to output a pixel in a multivalue tone cannot compensate for a change of the quantity of light due to durability degradation of an optical shutter element, since the optical shutter open period is preset for each pixel. Thus, a half tone or the like can not be reproduced successfully, and an image of high quality cannot be obtained.

SUMMARY OF THE INVENTION

Therefore, an object of the present invention is to provide an exposure device capable of reducing unevenness in a quantity of light due to durability degradation of each optical shutter element.

Another object of the present invention is to provide an exposure device capable of forming an image formed of pixels having a multivalue tone always in an appropriate state.

The above objects of the present invention are achieved by an exposure device which performs an exposure operation for a plurality of pixels having a multivalue tone to form an image consisting of the plurality of pixels, including:

a plurality of optical shutter elements corresponding to the plurality of pixels for controlling an amount of exposure for each of the plurality of pixels by an openclose operation;

a detector for detecting an accumulation of periods during which each optical shutter element is opened;

a discriminator for discriminating the longest accumulated period of accumulated periods detected by the detector;

a calculator for calculating, for each optical shutter element, a time difference between the longest accumulated period discriminated by the discriminator and an accumulated open period of each optical shutter element; and a controller for opening each optical shutter element for the time difference calculated by the calculator for each optical shutter element.

Accumulated open drive periods for the plurality of optical shutter elements are detected, and the longest accumulated drive period is discriminated from the detected accumulated drive periods. The calculator calculates the time difference between the discriminated longest accumulated drive period and an accumulated open period for each optical shutter element, and each optical shutter is caused to emit light for the operated time difference. Consequently, time differences among accumulated drive periods of optical shutter elements are eliminated. This can result in virtually a uniform reduction in the amount of light emission caused by durability degradation among all shutters and thus unevenness in the quantity of light can be reduced.

In another aspect of the present invention, an exposure device which performs exposure for a plurality of pixels for forming an image includes:

a plurality of optical shutter elements corresponding to the plurality of pixels for controlling an amount of exposure for each of the plurality of pixels by an open-close operation;

a detector for detecting an accumulated open period of each optical shutter element;

a first controller for controlling a voltage applied to each optical shutter element according to the accumulated period detected by the detector; and a second controller for controlling an open period of each optical shutter element according to the voltage controlled by the first controller and a tone number of each pixel.

Accumulated open periods of a plurality of optical shutter elements are detected. A driving voltage to each optical shutter element is controlled according to the detected accumulated open period of each optical shutter element. Since an open period of each optical shutter is controlled according to the controlled driving voltage and the tone of a pixel to be exposed, the driving voltage is adjusted to an optimal value depending on the durability degradation of each optical shutter element. Simultaneously the open period of the optical shutter is also adjusted and hence an exposure device can be provided capable of forming an image consisting of pixels of a multivalue tone always in an appropriate state.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS (1) First Embodiment

A first embodiment of the present invention will now be described with reference to the FIG. 1 through FIG. 5.

Figure 1:
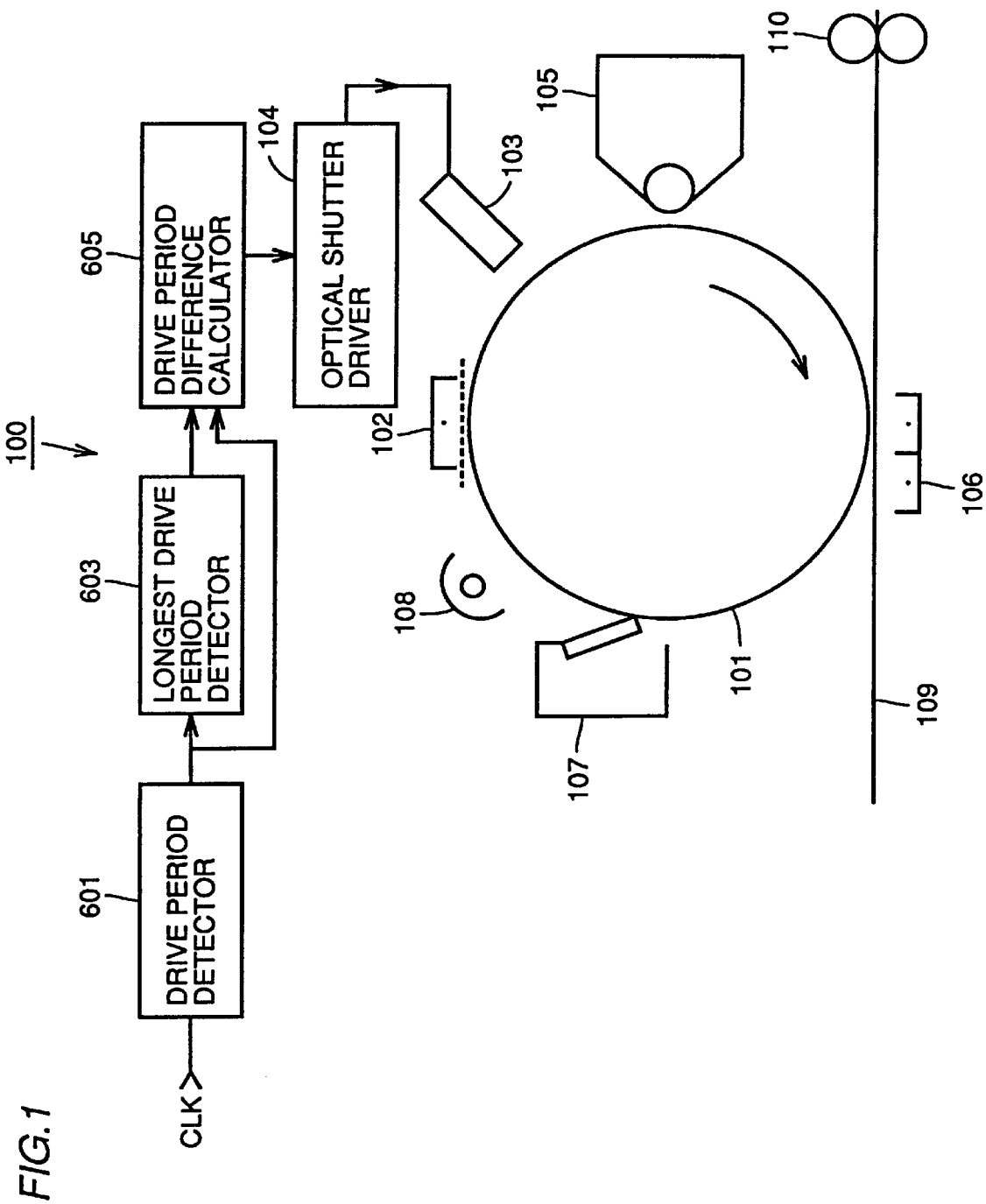
FIG. 1 is a diagram of an image forming device having an exposure device according to a first embodiment of the present invention.

Referring to FIG. 1, an image forming device includes a photosensitive drum 101, a corona charger 102, an exposure device 100 having an optical shutter array 103, an optical shutter driver 104, a developer 105, a transfer/separation charger 106, a cleaner 107, a residual ellimination lamp 108 and a transportation roller 110. The exposure device 100 includes a drive period detector 601 which detects an accumulated drive period Tx of each optical shutter element of optical shutter array 103 until the completion of the exposure of one image, a longest drive period detector 603 which detects the longest accumulated drive period A among all optical shutter elements based on accumulated drive periods Tx detected by the drive period detector 601, and a drive period difference calculator 605 which determines a drive time difference (A−Tx) based upon an accumulated drive period Tx detected by the drive period detector 601 and the longest accumulated drive period A detected by the longest drive period detector 603.

Drive period detector 601 is connected to the longest drive period detector 603 which is connected to drive period difference calculator 605. Drive period difference calculator 605, which is connected also to the drive period detector 601, is connected to the optical shutter driver 104 which is connected to the optical shutter array 103.

Figure 12:
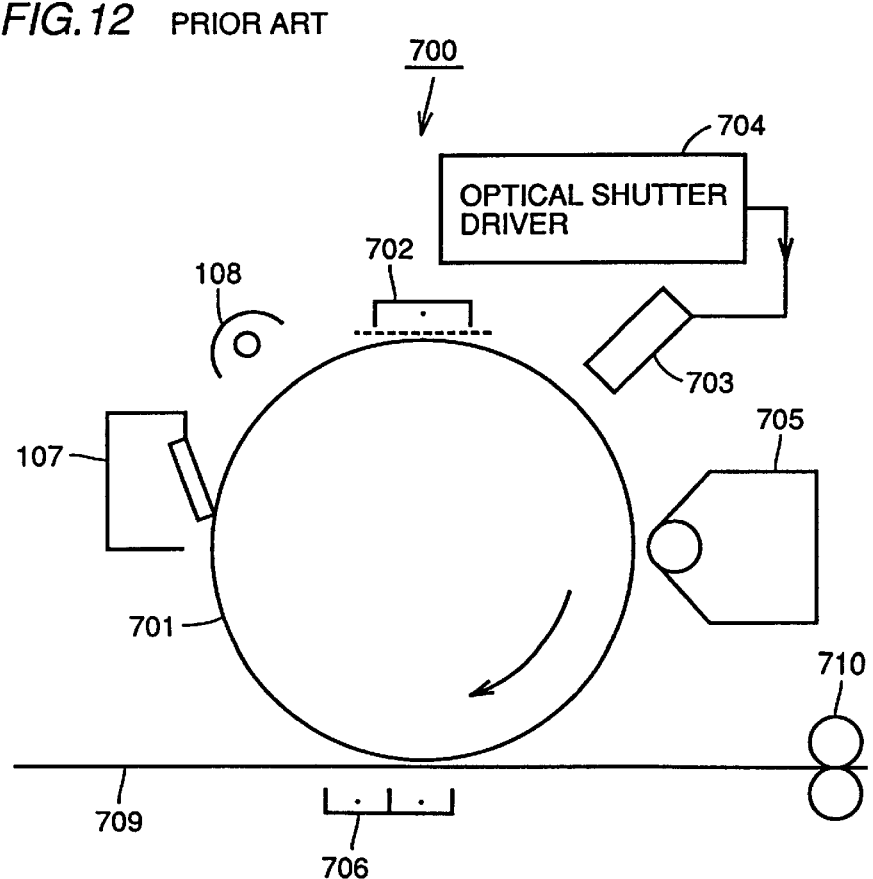
FIG. 12 is a diagram of a conventional image forming device.
Figure 13A:
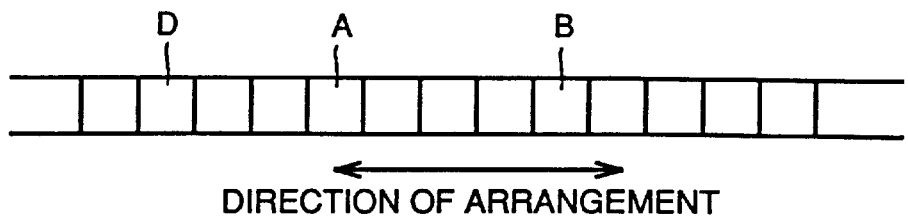
FIGS. 13A and 13B are diagrams of arrangements of optical shutter elements of an optical shutter array in a conventional image forming device.
Figure 13B:
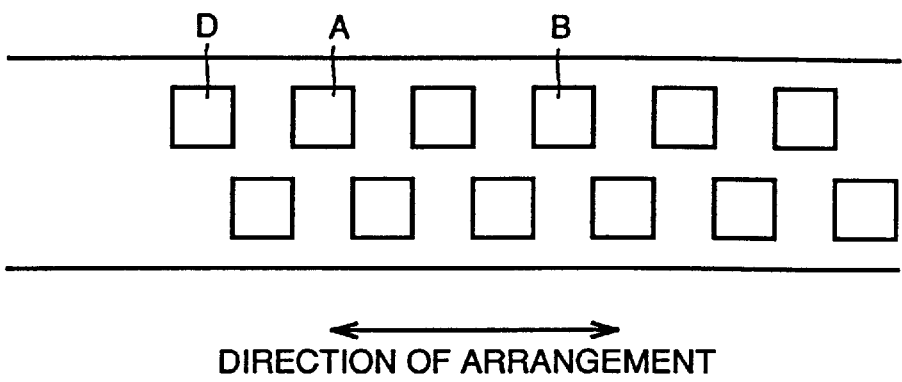
Figure 14:
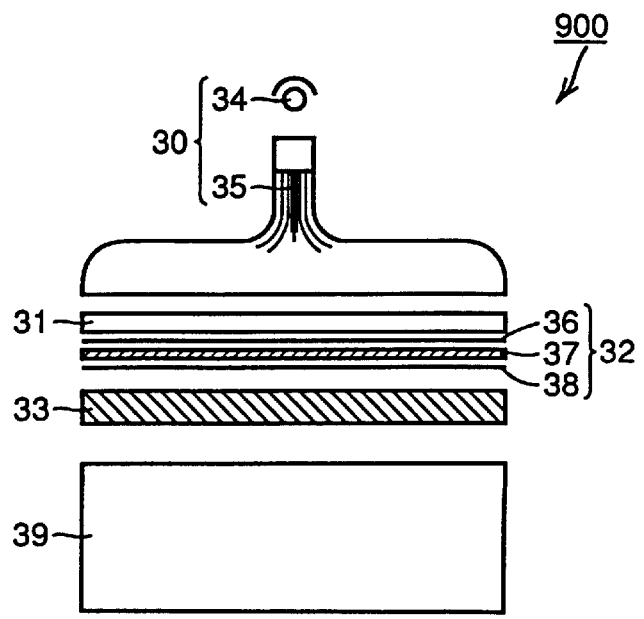
FIG. 14 is a cross sectional view of the structure of a PLZT optical shutter head of an optical shutter array in a conventional image forming device.

The remainder of image forming device is similar in configuration and arrangement to portions 701–709 of the image forming device shown in FIG. 12 and a description thereof is not repeated.

A surface of the photosensitive drum 101 is charged by the corona charger 102. The optical shutter driver 104 generates a pulse signal which drives the optical shutter array 103 based on record data to produce an image pattern. According to the pulse signal, the optical shutter array 103 is operated and the charged photosensitive drum 101 is exposed to form an electrostatic latent image. Then, at the developer 105, which has a mag roller to which a developing bias voltage is applied, the electrostatic latent image is developed using a developer to form a toner image. The toner image is transferred by the transfer/separation charger 106 onto the recording sheet 109, which is then passed through a fixing device (not shown) to fix the transferred developer onto the recording sheet 109 and is discharged to the outside of the device. Meanwhile, the cleaner 107 removes any residual toner from the photosensitive drum 101 after the transfer and the residual elimination lamp 108 removes any residual charge.

Figures 4, 5:
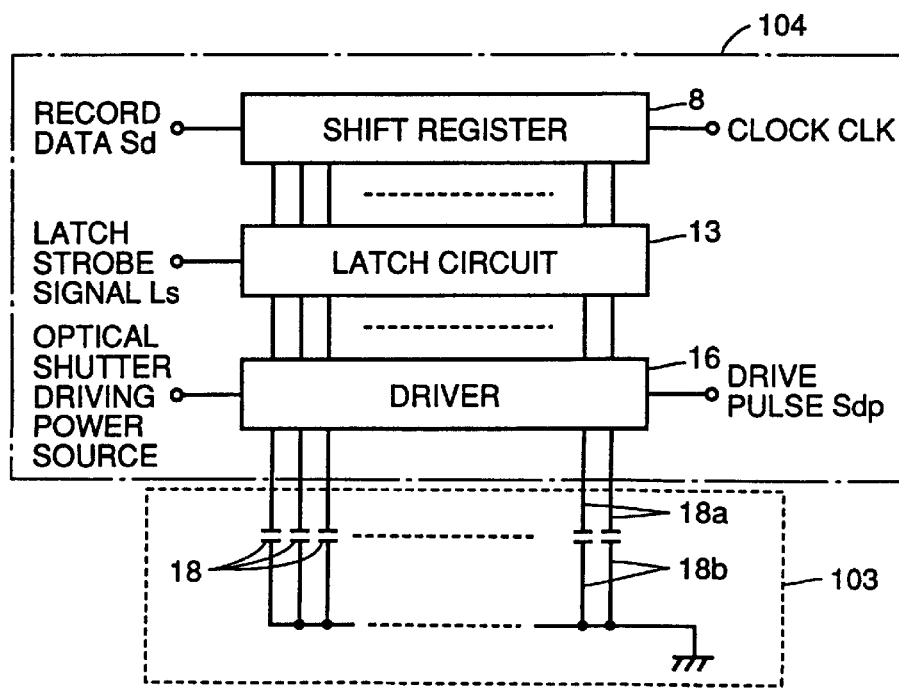
FIG. 4 is a diagram of the relationship between a pixel, an image-portion drive period, and a non image-portion drive period for steps S300–S330 shown in FIG. 3.
FIG. 5 is a schematic of an optical shutter array and an optical shutter driver of an exposure device according to the first embodiment of the present invention.
Figure 6:
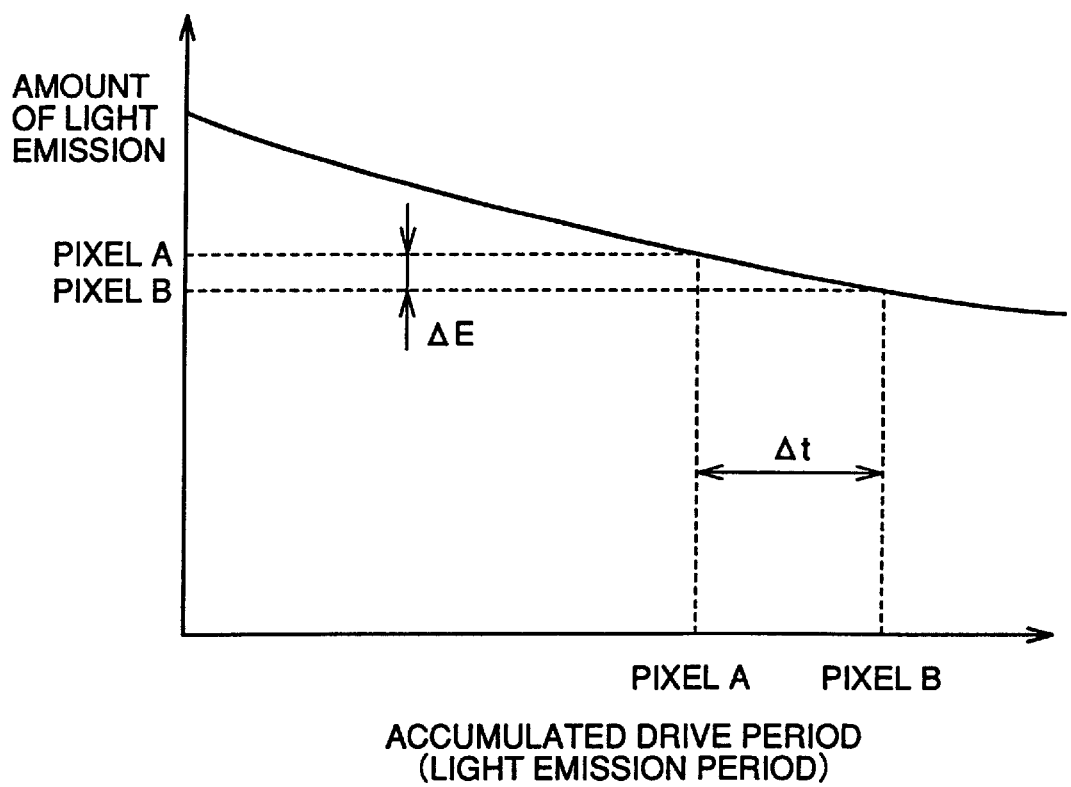
FIG. 6 is a diagram of the amount of light emission changes relative to the accumulated drive period of an optical shutter element.

FIG. 5 is a schematic of the optical shutter array 103 and the optical shutter driver 104 shown in FIG. 1.

Referring to FIG. 5, the optical shutter driver 104 includes a shift register 8 to which record data Sd representing an image to be exposed is serially inputted by one line, a latch circuit 13 which latches record data Sd inputted to shift register 8, and a driver 16 which selectively applies a direct voltage Vh(>0) to a plurality of optical shutter elements 18 of optical shutter array 103 based on record data Sd latched by latch circuit 13.

Driver 16 receives a drive pulse Sdp for defining a timing at which direct voltage Vh is applied to one electrode 18a of optical shutter element 18.

When a print command is inputted to expose an image, record data Sd is successively transferred to shift register 8 synchronously with a clock pulse CLK and serially by one line of the image. Then, record data Sd within shift register 8 is held by latch circuit 13 according to a latch strobe signal LS, and inputted and held at driver 16 by one line. Then, the driver 16 responds to a drive pulse Sdp and selectively applies direct voltage Vh to one electrode 18a of each optical shutter element 18 based on the held record data Sd by means of an optical shutter driving power source. The other electrode 18b of each optical shutter element 18 is connected to the ground.

Thus, when a positive direct voltage Vh is applied to one electrode 18a of an optical shutter element 18, an electric field in a predetermined direction is formed between one electrode 18a and the other electrode 18b. Due to an effect of the electric field, a desired optical shutter element 18 is turned on and transmits light. Meanwhile, an electric field is not formed between an electrode 18a to which direct voltage Vh is not applied and the other electrode 18b and thus the optical shutter element 18 corresponding to this electrode 18a is in an off state and thus does not transmit light.

Figure 2:
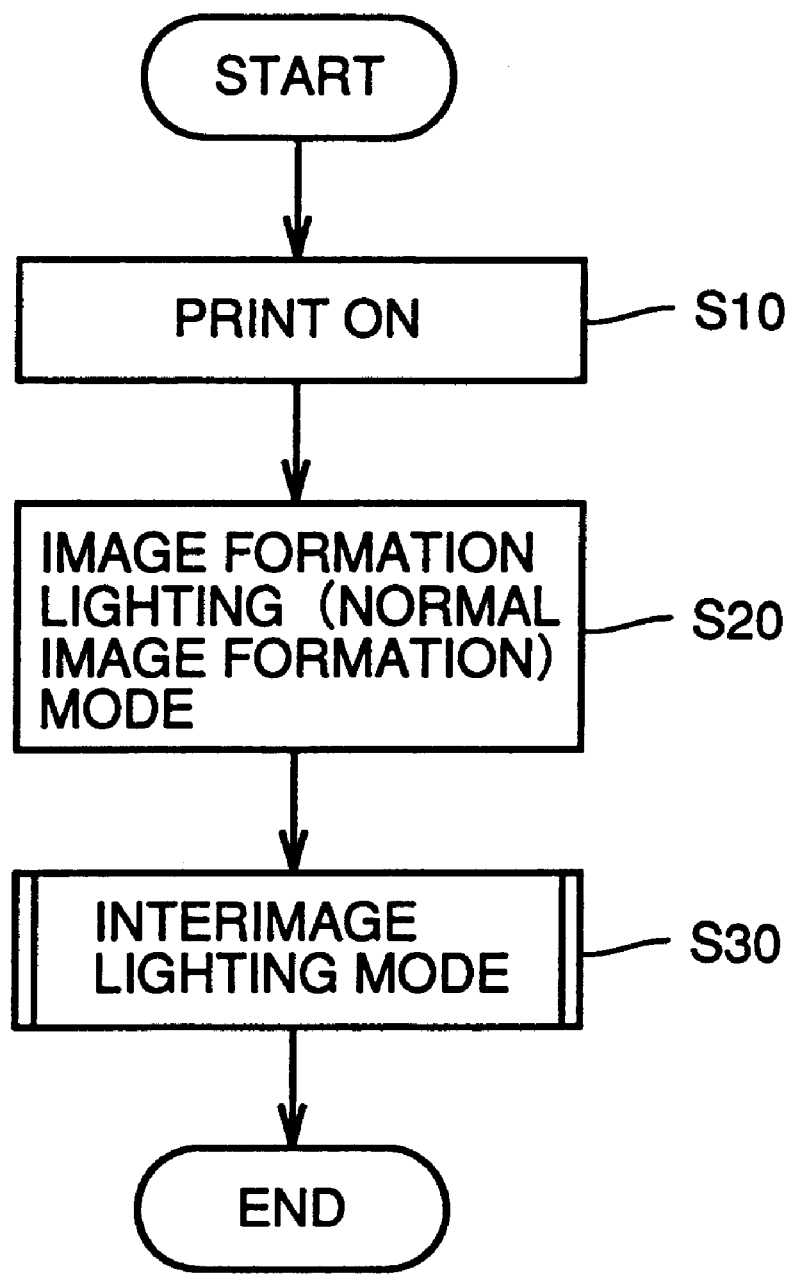
FIG. 2 is a flow chart of an operation of an image forming device according to the first embodiment of the present invention.

FIG. 2 is a flow chart representing an operation of the image forming device shown in FIG. 1 according to the first embodiment of the present invention.

The optical shutter driver 104 controls the open-close operation of each optical shutter element based on record data for an image pattern consisting of a plurality of pages. When a so-called image formation lighting mode as an normal image forming operation based on record data for an image pattern of a page being exposed is completed, an interimage lighting mode, which will be described later, is entered until an image forming operation based on record data for the image pattern of the next page as shown in FIG. 2 is started.

Referring to FIG. 2, when a print command is inputted at step S10 (the term "step" is omitted hereinafter), a normal image forming operation is performed at S20 and the optical shutter driver 104 selectively drives (opens and closes) an optical shutter corresponding to each pixel of an image pattern.

Then at S30, an interimage lighting mode is entered and any optical shutter with a shorter accumulated drive period is driven.

Figure 3:
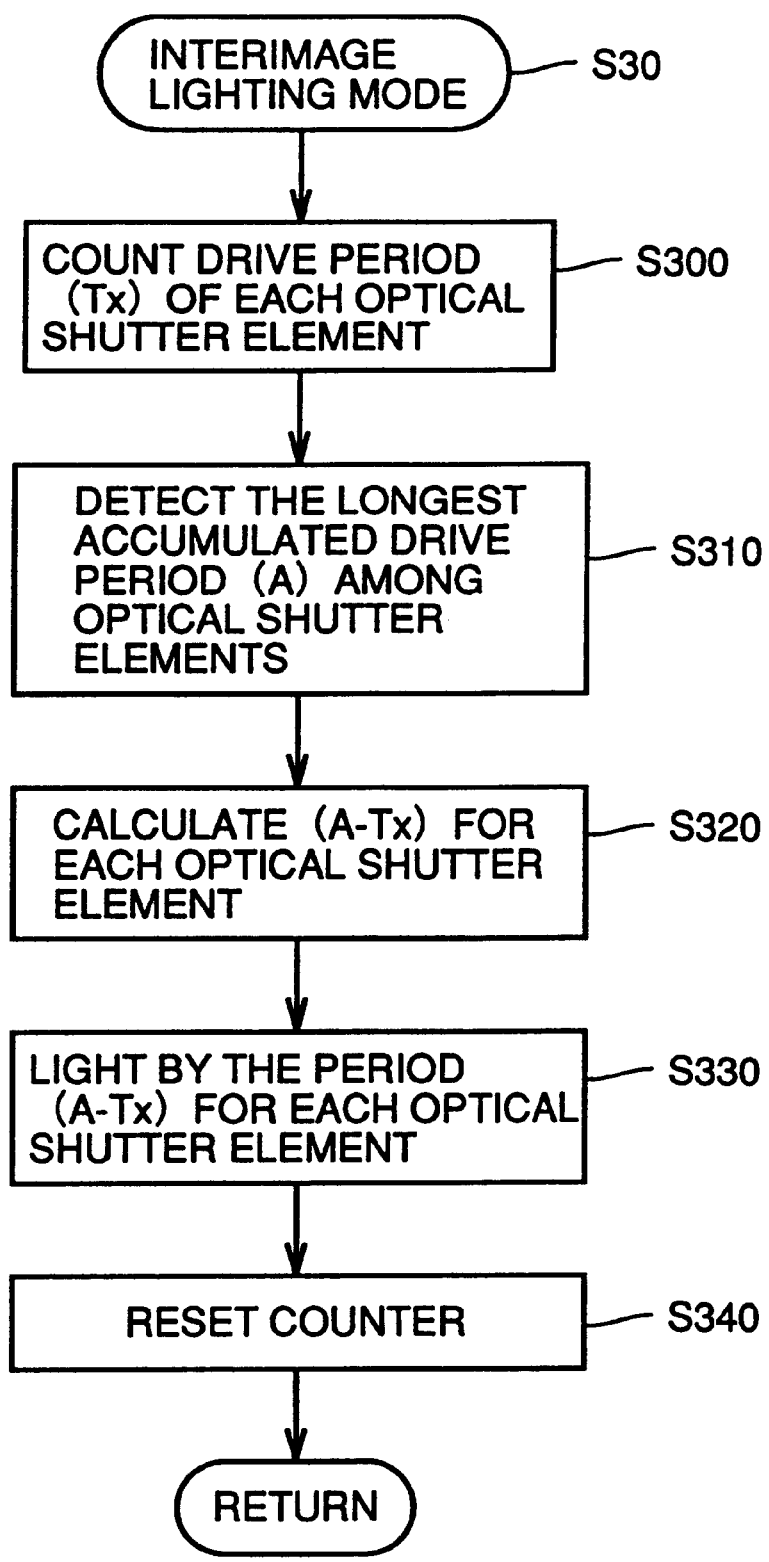
FIG. 3 is a flow chart illustrating a subroutine of an operation in the interimage lighting mode at step S30 shown in FIG. 2.

FIG. 3 is a flow chart illustrating a subroutine representing an operation in the interimage lighting mode at S30 shown in FIG. 2.

Referring to FIG. 3, at S300, the drive period detector 601 detects a drive period Tx for one image for each optical shutter element arranged in the longitudinal direction. At S310, the longest drive period detector 603 detects the longest drive period A among all optical shutter elements arranged in the longitudinal direction based on the drive period Tx detected by the drive period detect 601. At S320, based on a drive period Tx detected by the drive period detector 601 and the longest drive period A detected by the longest drive period detector 603, a drive period difference (A−Tx) which is set as a drive period in the interimage lighting mode is calculated by the drive period difference calculator 605 for each optical shutter element. At S330, a pulse signal is generated at optical shutter driver 104 and an optical shutter element is driven at an interimage portion for the period (A−Tx).

It should be noted that with the value of a developing bias voltage in the normal control (sequence), the developer adheres to a non image portion in the interimage lighting mode and thus the value of the developing bias voltage is controlled so as to be switched to a value at which the developer does not adhere to a non image portion when an interimage portion passes through developer 105 (see FIG. 1).

FIG. 4 shows a setting of the interimage-portion drive period at S300–S330 shown in FIG. 3.

Referring to FIG. 4, an image-portion drive period indicates a drive period of an optical shutter element in the normal image formation lighting mode, and an interimage-portion drive period indicates a drive period of an optical shutter in the interimage lighting mode.

Referring to FIG. 4, when the drive period Tm of the mth optical shutter element is the longest drive period A, the respective interimage-portion drive periods of n optical shutter elements 1–n are determined by subtracting their respective image-portion drive periods $T_1$–$T_n$ from the longest drive period A, i.e., $(A-T_1)$, $(A-T_2)$, . . ., $(A-T_n)$, respectively. That is, a period $(A-Tx)(x=1-n)$ is set as a drive period in the interimage lighting mode for each of n optical shutter elements arranged in the longitudinal direction, wherein the interimage-portion drive period mentioned above of the mth optical shutter element is 0.

When a series of operations in the interimage lighting mode is completed, a detect portion of drive period detector 601 is reset at S340 for the operation after the next image exposure.

Although the subroutine above shown in FIG. 3 describes that an operation is performed based on drive periods of optical shutter elements, in practice the above operation is performed based on accumulated values of record data for an image to be exposed, since a drive period of an optical shutter element is proportional to the accumulated value of record data for an image to be exposed. The operation will now be described.

A CPU (not shown) are connected to a counter memory (not shown) and record data transferred from the CPU to shift register 8 (see FIG. 2) are accumulated and recorded in the counter memory by one image for each pixel. An accumulated value of each pixel is subtracted from the largest accumulated value among all pixels to obtain an accumulated value of data output in the interimage lighting mode. Then, data matching the accumulated value is transferred to shift register 8 at an interimage portion and an optical shutter is driven as described with reference to FIG. 5. When the CPU reads record data of one image, the counter memory cancels the read record data.

Thus, each optical shutter element in an exposure device according to the present invention emits light in an interimage lighting mode to reduce any drive time difference among optical shutter elements. Thus, respective accumulated drive periods (i.e., light emission periods) of optical shutter elements are almost equal to one another and the decrease in the amount of light emission due to durability degradation of the optical shutter elements can be virtually uniform. An exposure device thus can be provided capable of reducing the occurrence of unevenness in the quantity of light.

The optical shutter array of the exposure device according to the above embodiment may be replaced with a solid scanner component employing another light emitting element or the like which has a similar function to obtain a similar effect.

Furthermore, the following modifications may be introduced under the conditions of the above embodiment to obtain a similar effect:

1). Although an accumulated drive period is adjusted during each cycle in the above embodiment, the cycle being constituted by an image portion plus an interimage portion between the image portion and the next image portion to be exposed, an accumulated drive period is adjusted each plurality of cycles.

2). Although an optical shutter element is driven during an interimage portion in the above embodiment, another mode which is different from the normal operation is newly set to drive an optical shutter element.

It should be noted that the optical shutter element mentioned above corresponds to an light emitting element and that a drive period thereof corresponds to a light emission period.

(2) Second Embodiment

A second embodiment of the present invention will now be described with reference to the FIG. 7 through FIG. 11.

Figure 7:
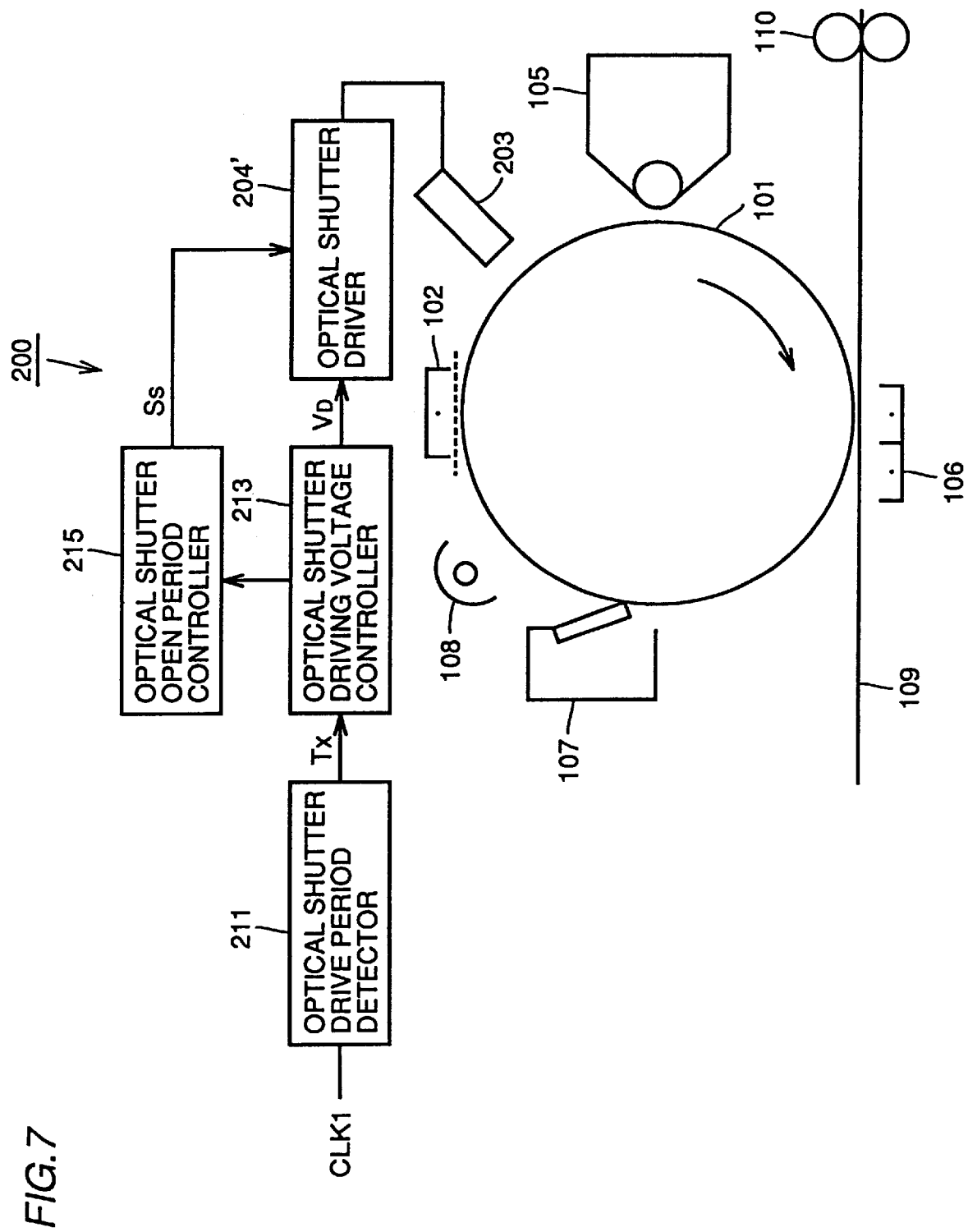
FIG. 7 is a diagram of an image forming device having an exposure device according to a second embodiment of the present invention.

FIG. 7 is a block diagram showing a configuration of an image forming device having an exposure device 200 according to the second embodiment of the present invention.

Referring to FIG. 7, the image forming device includes a printing portion, such as a photosensitive drum 101, a corona charger 102, a developer 105, a transfer/separation charger 106, a cleaner 107, a residual charge elimination lamp 108, which are similar in configuration and arrangement to that of the image forming device of the first embodiment shown in FIG. 1 and thus a description thereof is not repeated.

The image forming device includes an exposure device 200 having an optical shutter drive period detector 211 which detects an accumulated drive period Tx indicating an accumulation of optical shutter open periods of each optical shutter element of optical shutter array 203 until the exposure of one image is completed, an optical shutter driving voltage controller 213 which controls a driving voltage $V_D$ for each optical shutter element, and an optical shutter open period controller 215 which controls an open period Ss of each optical shutter element, as a controlling portion for optical shutter 203.

The optical shutter drive period detector 211 is connected to the optical shutter driving voltage controller 213 which is connected to the optical shutter open period controller 215 and the optical shutter driver 204. The optical shutter open period controller 215 is connected to the optical shutter driver 204' which is connected to the optical shutter array 203.

Figure 8:
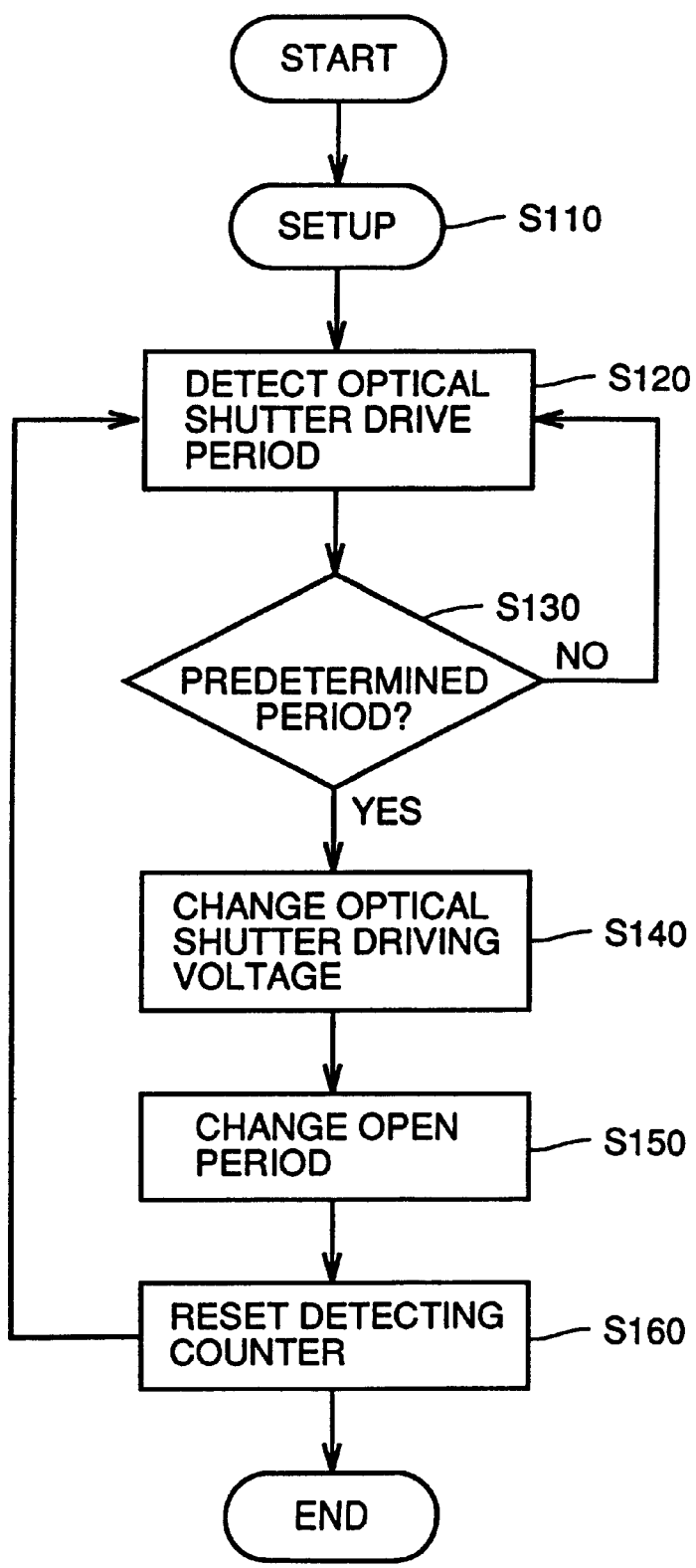
FIG. 8 is a flow chart of an operation of the image forming device according to the second embodiment of the present invention.

FIG. 8 is a flow chart illustrating an operation of the image forming device shown in FIG. 7 according to the second embodiment of the present invention.

When an image exposure is setup at step S110, the optical shutter drive period detector 211 detects an accumulated drive period of each optical shutter element (hereinafter referred to as an optical shutter drive period) Tx at S120. Detection of an accumulated drive period Tx of an optical shutter element is started when a clock CLK is input.

Figures 9, 10:
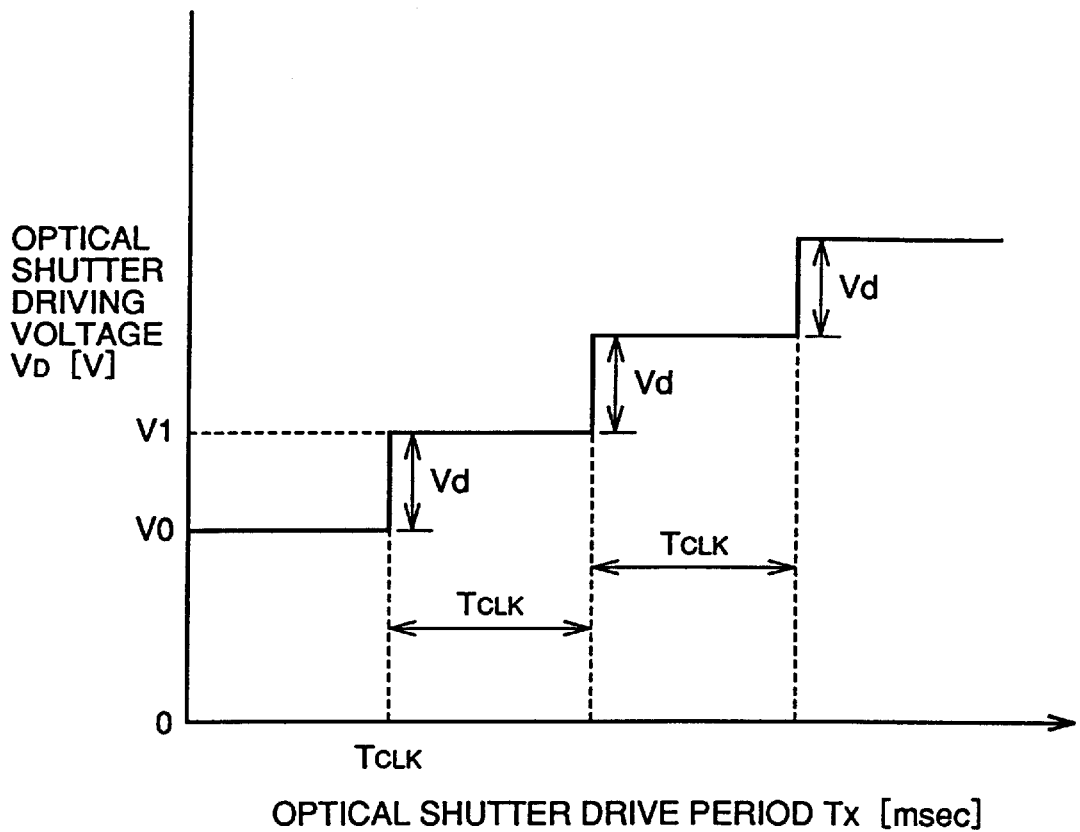
FIG. 9 is a diagram of an optical shutter driving voltage in the image forming device according to the second embodiment of the present invention as an optical shutter drive period elapses.
FIG. 10 is a lookup table of an optical shutter driving voltage and an optical shutter open period which are set relative to a pixel output tone in the image forming device according to the second embodiment of the present invention.

FIG. 9 represents an optical shutter drive voltage $V_D$ as an optical shutter drive period Tx elapses.

Referring to FIG. 9, when the optical shutter drive period detector 211 detects that an optical shutter drive period Tx has reached a predetermined detection period $T_{CLK}$ and a determination of YES is made at S130, the optical shutter drive voltage control device 213 receives a signal (Tx). Signal (Tx) allows the driving voltage $V_D$ supplied to an optical shutter element to be changed from V0 volt to V1 volt which is larger than V0 volt by a predetermined voltage of Vd volt. This compensates for a reduction in light transmitted from an optical shutter in proportion to an accumulated drive period and due to durability degradation.

Figure 15:
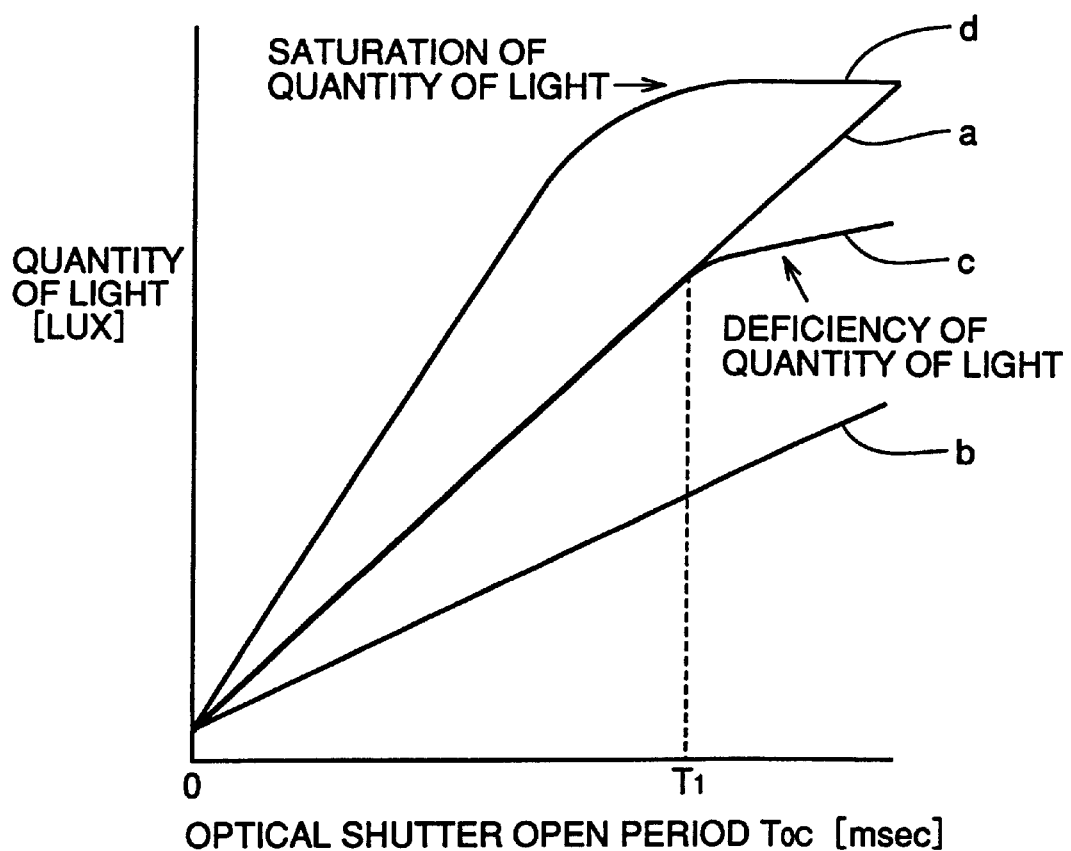
FIG. 15 is a state diagram showing a relationship between an optical shutter open period and a quantity of light outputted.

However, when driving voltage $V_D$ for an optical shutter element is changed from V0 volt to V1 volt, a sufficient amount of transmitted light may not be obtained around the largest quantity of light even for an equivalent open period or the quantity of light can be saturated, as shown in FIG. 15. Thus, when a pixel is output in a multivalue tone, an appropriate tone cannot be obtained. Then, after the driving voltage is changed at S140, optical shutter open period controller 215 changes the open period of the optical shutter to an open period predetermined according to the changed driving voltage at S150.

FIG. 10 is a lookup table of the optical shutter drive voltage $V_D$ and the optical shutter open period $T_{OC}$ which are set corresponding to the pixel output tone.

Referring to FIG. 10, a lookup table is preset which determines the optical shutter open period $T_{OC}$ ($T_{O'O}-T_{n'n}$) relative to the optical shutter driving voltage $V_D$ (V0–Vn) such that they correspond to a multivalue tone (0–n). According to the lookup table, an optical shutter open period corresponding to an optical shutter driving voltage is determined at S150. A determined optical shutter open period $T_{OC}$ is input to the optical shutter driver 204 as data Ss for changing an optical shutter open period.

Figure 11:
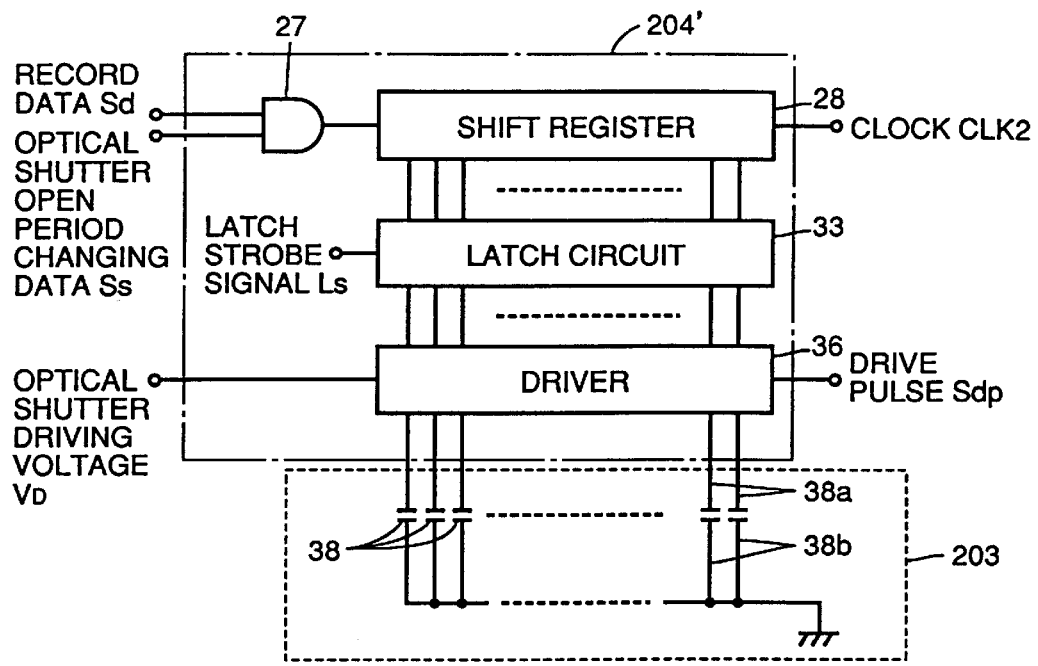
FIG. 11 is a schematic of an optical shutter driver circuit in the image forming device according to the second embodiment of the present invention.

FIG. 11 is a circuit diagram electrically equivalent to optical shutter driver 204 and optical shutter array 103.

Referring to FIG. 11, optical shutter driver 204 includes a shift register 28, a latch circuit 33, a driver 36 and an AND circuit 27.

In the optical shutter driver 204, the shift register 28 is connected to the latch circuit 33 which is connected to the driver 36. The AND circuit 27 receives optical shutter open period data Ss and record data Sd representing pixel tone and outputs a product thereof to shift register 28.

As with the optical shutter driver 104 shown in FIG. 5, when a print command is input and a setting up is completed in optical shutter driver 204, record data Sd for an image to be exposed is inputted by one line to shift register 28 via the AND circuit 27 and latched by the latch circuit 33. Simultaneously, based on an optical shutter drive voltage $V_D$ which is set according to a detected optical shutter drive period Dx and on a pixel tone, a corresponding optical shutter open period $T_{OC}$ shown in FIG. 10 is input via the AND circuit 27 to the shift register 28 through data Ss for changing an optical shutter open period, latched by latch circuit 33 and input to driver 36. The driver 36 responds to a drive pulse Sdp and selectively applies an optical shutter driving voltage $V_D$ applied from the optical shutter drive voltage control device 213 shown in FIG. 7 to each electrode 38a depending on the latched record data Sd according to the voltage $V_D$ and the optical shutter open period Toc. Thus, due to an effect of the electric field, an optical shutter 38 is opened and closed synchronously with the rotation of photosensitive drum 101 according to the optical shutter open period changing data Ss per record data of one line. This operation is repeatedly performed until an image of one page has been recorded. More specifically, at S160 a counter for detecting a drive period Tx ($T_{CLK}$) in the optical shutter drive period detector 211 is reset after each exposure of one line and then the control returns to S120 where the detection of a drive period Tx ($T_{CLK}$) is again started. This routine is repeated and the optical shutter drive voltage $V_D$ and the optical shutter open period $T_{OC}$ are changed.

Thus, an optical shutter drive period indicating an accumulation of open periods of an optical shutter which serves as an indication of durability degradation is detected, an optical shutter driving voltage is set based on the detected optical shutter open period, and the open period of the optical shutter is changed corresponding to a tone of a pixel to be exposed. Thus, depending on the durability degradation of each optical shutter, the drive voltage is adjusted to an optimal value and simultaneously the open period of the optical shutter is also adjusted.

Thus, an image forming device can be provided capable of forming by exposure an image consisting of pixels of a multivalue tone always in an appropriate condition.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An exposure device for exposing a plurality of pixels to form an image, comprising:

a plurality of optical shutter elements corresponding to said plurality of pixels for controlling an amount of exposure for each of said plurality of pixels by an open-close operation;

a first detector for detecting an accumulation of open periods of each of said plurality of optical shutter elements;

a first controller for controlling a voltage, applied to each respective one of said optical shutter elements, during formation of an image according to the corresponding accumulation of open periods for a respective optical shutter element detected by said first detector; and a second controller for controlling an open period of each respective one of said optical shutter elements according to (a) said voltage controlled by said first controller and to (b) a tone number of each pixel.

2. The exposure device according to claim 1, wherein said plurality of optical shutter elements are an optical shutter array arranged in one line.

3. The exposure device according to claim 1, wherein said plurality of optical shutter elements are an optical shutter array staggered in two lines.

4. The exposure device according to claim 1, further comprising a second detector for detecting whether the accumulation of open periods detected by said first detector has reached a predetermined period.

5. The exposure device according to claim 4, wherein when said second detector detects that the accumulation of open periods has reached the predetermined period, said first controller increases the voltage applied to each optical shutter element.

6. The exposure device according to claim 5, wherein when said first controller increases the voltage applied to each optical shutter element, said second controller changes the open period of each of said plurality of optical shutter elements to an open period for each optical shutter element, which is preset according to a tone number of each pixel to be exposed.

7. The exposure device according to claim 6, further comprising storage means for correspondingly prestoring the voltage controlled by said first controller, the open period of said optical shutter element controlled by said second controller and the tone number, such that they have a predetermined correlation.

8. The exposure device according to claim 7, wherein said storage means is a lookup table.

9. An exposure method of performing exposure for a plurality of pixels to form an image, comprising the steps of:
controlling an open-close operation of a plurality of optical shutter elements corresponding to said plurality of pixels to control an amount of exposure for each of said plurality of pixels;
detecting an accumulation of open periods of each of said plurality of optical shutter elements;
controlling a voltage, applied to each respective one of said plurality of optical shutter elements, during formation of an image according to the accumulation of open periods detected for a respective optical shutter element; and
controlling an open period of each respective one of said plurality of optical shutter elements according to (a) said controlled voltage and (b) a tone number of each pixel to be exposed.

10. An imaging device for reproducing an image, said imaging device comprising:
a plurality of imaging elements;
a driver which is connected to said plurality of imaging elements, said driver being capable of driving said plurality of imaging elements based on tones of image data to represent the image;
a detector which can detect a drive accumulation of each of said plurality of imaging elements; and
a controller which can control said driver to drive said plurality of imaging elements during reproduction of the image based on both the drive accumulations and the tones of the image data.

11. The imaging device according to claim 10, wherein the drive accumulations represent driving time periods of each of said plurality of imaging elements, respectively.

12. The imaging device according to claim 10, wherein said controller applies driving voltages, respectively corresponding to each of said plurality of imaging elements, to said driver in accordance with the drive accumulations.

13. The imaging device according to claim 10, wherein each of said plurality of imaging elements is for emitting light signals.

14. The imaging device according to claim 13, wherein each of said plurality of said imaging elements is a light shutter element.

15. The imaging device according to claim 10, wherein said driver comprises a modifier which modifies the tones of the image data in accordance with the drive accumulations, and wherein said driver drives said plurality of imaging elements in accordance with the tones of the image data modified by said modifier.

16. An imaging device for reproducing an image, said imaging device comprising:
a plurality of imaging elements;
a driver which is connected to said plurality of imaging elements, said driver being for driving said plurality of imaging elements, based on inputted image data, to represent the image;
a detector which detects a plurality of drive statuses of said plurality of imaging elements during a reproduction of the image by said plurality of imaging elements; and
a controller which controls said driver according to the drive statuses detected by said detector, wherein said controller controls said driver according to the drive statuses detected by said detector when the imaging elements are being driven by said driver to reproduce the image.

17. The imaging device according to claim 16, wherein said controller applies driving voltages, respectively corresponding to each of said plurality of imaging elements, to said driver in accordance with the drive statuses.

18. The imaging device according to claim 16, wherein the drive statuses correspond to each of said plurality of imaging elements, respectively.

19. The imaging device according to claim 16, wherein the drive statuses represent accumulations of driving time periods of each of said plurality of imaging elements, respectively.

20. An imaging device for reproducing an image, said imaging device comprising:
a plurality of imaging elements;
a driver which is connected to said plurality of imaging elements, said driver for driving said plurality of imaging elements based on image data to represent the image;
a detector which detects a plurality of drive accumulations of said plurality of imaging elements; and
a controller which controls said driver according to the drive accumulations detected by said detector when the said plurality of imaging elements are being driven by said driver based on the image data.

21. The imaging device according to claim 20, wherein the drive accumulations correspond to each of said plurality of imaging elements, respectively.

22. The imaging device according to claim 20, wherein said controller applies driving voltages, respectively corresponding to each of said plurality of imaging elements, to said driver in accordance with the drive accumulations.

23. The imaging device according to claim 20, wherein the drive accumulations represent driving time periods of each of said plurality of imaging elements, respectively.

24. An imaging device for reproducing an image, said imaging device comprising:
a plurality of imaging elements;
a driver which is connected to said plurality of imaging elements, said driver being capable of driving said plurality of imaging elements based upon image data to reproduce the image;
a detector which can detect a status of a specific one of said plurality of imaging elements during reproduction of the image; and
a controller which can control said driver to control at least the specific one of said plurality of imaging elements during reproduction of the image, based upon the status detected by said detector, and which controls a remainder of said plurality of imaging elements irrespective of the status detected by said detector.

25. The imaging device according to claim 24, wherein the status represents an accumulation of drive periods of the specific one of said imaging elements.

26. An exposure method of performing exposure for a plurality of pixels to form an image, comprising the steps of:
providing a plurality of imaging elements;
driving said plurality of imaging elements based on tones of image data to represent the image;
detecting a drive accumulation of each of said plurality of imaging elements; and
controlling said plurality of imaging elements during exposure of the image based on both the drive accumulations and the tones of the image data.

* * * * *